US 8,558,718 B2

(12) United States Patent
Mochizuki et al.

(10) Patent No.: US 8,558,718 B2
(45) Date of Patent: Oct. 15, 2013

(54) METHOD OF CONTROLLING A COLLISION WARNING SYSTEM USING LINE OF SIGHT

(75) Inventors: Yutaka Mochizuki, Utsunomiya (JP); Radovan Miucic, Southfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 403 days.

(21) Appl. No.: 12/885,790

(22) Filed: Sep. 20, 2010

(65) Prior Publication Data
US 2012/0068859 A1    Mar. 22, 2012

(51) Int. Cl.
*G08G 1/16* (2006.01)

(52) U.S. Cl.
USPC ............ 340/903; 340/539.11; 340/436

(58) Field of Classification Search
USPC .......... 340/903, 439, 440, 441, 435, 438, 340/539.11, 901, 904, 944, 463, 436
See application file for complete search history.

(56) References Cited

U.S. PATENT DOCUMENTS

| | | | |
|---|---|---|---|
| 4,694,295 A * | 9/1987 | Miller et al. ............... 340/903 |
| 6,275,180 B1 * | 8/2001 | Dean et al. ................. 342/70 |
| 6,289,332 B2 * | 9/2001 | Menig et al. ............... 180/167 |
| 6,370,475 B1 | 4/2002 | Breed et al. |
| 6,405,132 B1 | 6/2002 | Breed et al. |
| 6,526,352 B1 | 2/2003 | Breed et al. |
| 6,720,920 B2 | 4/2004 | Breed et al. |
| 6,768,944 B2 | 7/2004 | Breed et al. |
| 7,079,024 B2 * | 7/2006 | Alarcon ..................... 340/539.11 |
| 7,085,637 B2 | 8/2006 | Breed et al. |
| 7,095,336 B2 | 8/2006 | Rodgers et al. |
| 7,110,880 B2 | 9/2006 | Breed et al. |
| 7,202,776 B2 | 4/2007 | Breed |
| 7,295,925 B2 | 11/2007 | Breed et al. |
| 7,418,346 B2 | 8/2008 | Breed et al. |
| 7,426,437 B2 | 9/2008 | Breed et al. |
| 2002/0121398 A1 * | 9/2002 | Kikuchi et al. ............. 180/169 |
| 2007/0054685 A1 * | 3/2007 | Kellum .................... 455/517 |
| 2007/0225912 A1 | 9/2007 | Grush |
| 2008/0015771 A1 | 1/2008 | Breed et al. |
| 2008/0040023 A1 | 2/2008 | Breed et al. |
| 2008/0040029 A1 | 2/2008 | Breed |
| 2008/0042815 A1 | 2/2008 | Breed et al. |
| 2008/0106436 A1 | 5/2008 | Breed |
| 2008/0133136 A1 | 6/2008 | Breed et al. |
| 2008/0140318 A1 | 6/2008 | Breed |
| 2008/0147253 A1 | 6/2008 | Breed |
| 2008/0150786 A1 | 6/2008 | Breed |
| 2008/0154495 A1 | 6/2008 | Breed |
| 2008/0154629 A1 | 6/2008 | Breed et al. |
| 2008/0161986 A1 | 7/2008 | Breed |
| 2008/0161987 A1 | 7/2008 | Breed |
| 2008/0162036 A1 | 7/2008 | Breed |
| 2008/0165018 A1 | 7/2008 | Breed |
| 2008/0167821 A1 | 7/2008 | Breed |
| 2009/0002221 A1 * | 1/2009 | Mead et al. ................ 342/113 |
| 2009/0237644 A1 * | 9/2009 | Uechi ....................... 356/29 |
| 2010/0097199 A1 * | 4/2010 | Schwartz et al. ........... 340/435 |

* cited by examiner

*Primary Examiner* — Daniel Previl
(74) *Attorney, Agent, or Firm* — Plumsea Law Group, LLC

(57) ABSTRACT

A collision warning system for a motor vehicle is disclosed. The collision warning system includes a first mode and a second mode. The system operates in the first mode when there is line of sight with a target vehicle. The system operates in the second mode where there is no line of sight with the target vehicle.

20 Claims, 14 Drawing Sheets

METHOD OF CONTROLLING A COLLISION WARNING SYSTEM USING LINE OF SIGHT

BACKGROUND OF THE INVENTION

1. Field of the Invention

The present invention relates to motor vehicles and in particular to a collision warning system for a motor vehicle.

2. Description of Related Art

Collision warning systems have been previously proposed. Collision warning systems can alert a driver to potential hazards posed by other vehicles or objects near or on a roadway. Some collision warning systems use visual and/or audible messages to alert a driver of potential collisions.

SUMMARY OF THE INVENTION

The invention discloses an automated collision warning system. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted into kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of operating a collision warning system in a motor vehicle, comprising the steps of: receiving information related to a target vehicle; determining if the target vehicle is in a line of sight of the motor vehicle; the collision warning system including multiple alert modes; operating the collision warning system in a normal alert mode when the target vehicle is in the line of sight of the motor vehicle; operating the collision warning system in an enhanced alert mode when the target vehicle is not in the line of sight of the motor vehicle; and wherein the normal alert mode is different than the enhanced alert mode.

In another aspect, the invention provides a method of operating a collision warning system in a motor vehicle, comprising the steps of: receiving a signal transmitted by a target vehicle; determining a measured signal characteristic from the signal transmitted by the target vehicle; retrieving a reference signal characteristic corresponding to the measured signal characteristic; determining a line of sight condition for the motor vehicle with respect to the target vehicle using the measured signal characteristic and the reference signal characteristic; operating the collision warning system in a normal alert mode when the target vehicle is in the line of sight of the motor vehicle; operating the collision warning system in an enhanced alert mode when the target vehicle is not in the line of sight of the motor vehicle; and wherein the normal alert mode is different than the enhanced alert mode.

In another aspect, the invention provides a method of operating a collision warning system in a motor vehicle, comprising the steps of: receiving information related to a target vehicle; receiving information related to an intermediate vehicle; determining if the intermediate vehicle obstructs the line of sight between the motor vehicle and the target vehicle; operating the collision warning system in a normal alert mode when the target vehicle is in the line of sight of the motor vehicle; and operating the collision warning system in an enhanced alert mode when the target vehicle is not in the line of sight of the motor vehicle.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

Figure 1:
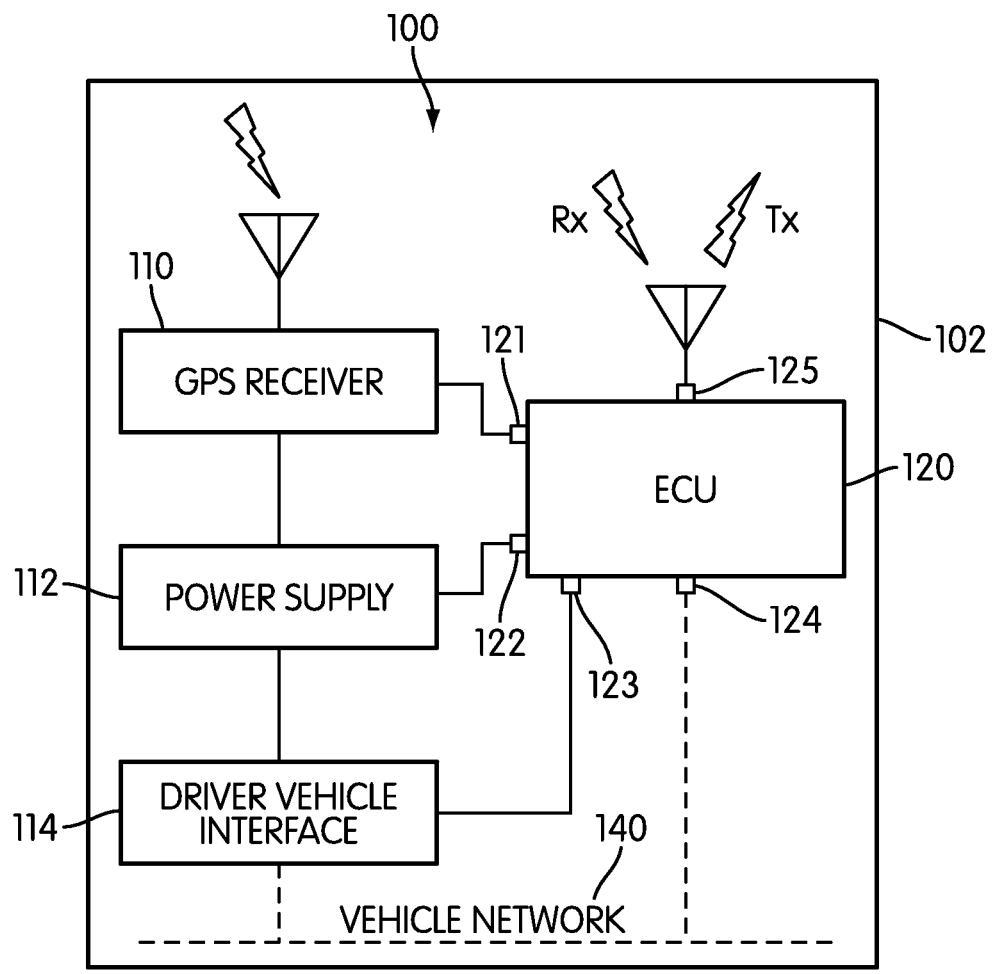
FIG. 1 is a schematic view of an embodiment of a collision warning system.

FIG. 1 is a schematic view of an embodiment of collision warning system 100 that is configured to be used within motor vehicle 102. Collision warning system 100 may be a system configured to detect potential collisions as well as to alert a driver or passenger to potential collisions. For purposes of clarity, only some components of a motor vehicle that may be relevant to collision warning system 100 are illustrated. Furthermore, in other embodiments, additional components can be added or removed.

Collision warning system 100 can include provisions for receiving GPS information. In some cases, collision warning system 100 can include GPS receiver 110. In an exemplary embodiment, GPS receiver 110 can be used for gathering GPS information for any systems of a motor vehicle, including, but not limited to: GPS based navigation systems.

Collision warning system 100 can include provisions for powering one or more devices. In some cases, collision warning system 100 can include power supply 112. Generally, power supply 112 can be any type of power supply associated with a motor vehicle. In some cases, power supply 112 can be a car battery. In other cases, power supply 112 can be another type of power supply available within motor vehicle 102.

Collision warning system 100 can include provisions for communicating with a driver. In some embodiments, collision warning system 100 can include driver vehicle interface 114. In some cases, driver vehicle interface 114 can include provisions for transmitting information to a driver and/or passenger. In other cases, driver vehicle interface 114 can include provisions for receiving information from a driver and/or passenger. In an exemplary embodiment, driver vehicle interface 114 can include provisions for transmitting and receiving information from a driver and/or passenger.

Motor vehicle 102 may include provisions for communicating, and in some cases controlling, the various components associated with collision warning system 100. In some embodiments, collision warning system 100 may be associated with a computer or similar device. In the current embodiment, collision warning system may include electronic control unit 120, hereby referred to as ECU 120. In one embodiment, ECU 120 may be configured to communicate with, and/or control, various components of collision warning system 100. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include first port 121 for communicating with GPS receiver 110. In particular, ECU 120 may be configured to receive GPS information from GPS receiver 110. In addition, ECU 120 can include second port 122 for receiving power from power supply 112. Also, ECU 120 can include third port 123 for communicating with driver vehicle interface 114. In particular, ECU 120 can be configured to transmit information to driver vehicle interface 114, as well as to receive information from driver vehicle interface 114.

A collision warning system can include provisions for communicating with one or more vehicles using a vehicle communication network. The term "vehicle communication network" as used throughout this detailed description and in the claims refers to any network utilizing motor vehicles and roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m.

In some embodiments, ECU 120 may include fifth port 125 that is configured to communicate with one or more DSRC devices. In an exemplary embodiment, fifth port 125 may be associated with a DSRC antenna that is configured to transmit and/or receive vehicle information over one or more vehicle communication networks.

Collision warning system 100 can include provisions for communicating with one or more components of a motor vehicle that are not associated directly, or indirectly with collision warning system 100. In some cases, ECU 120 may include additional ports for communicating directly with one or more additional devices of a motor vehicle, including various sensors or systems of the motor vehicle. In an exemplary embodiment, ECU 120 may include fourth port 124 for communicating with vehicle network 140. By providing communication between ECU 120 and vehicle network 140, ECU 120 may have access to additional information concerning motor vehicle 102. For instance, in some cases, ECU 120 may be configured to receive information related to various operating conditions of a motor vehicle. Examples of information that may be received via vehicle network 140 include, but are not limited to: vehicle speed, engine speed, braking conditions, as well as other parameters associated with the operating condition of motor vehicle 102.

A collision warning system can include provisions for controlling one or more systems in a motor vehicle that may be utilized during a collision, or that can be used to help avoid a collision. For example, in some embodiments, ECU 120 may be configured to communicate with a brake actuator to help control braking prior to, or during a collision. In other embodiments, ECU 120 may be configured to communicate with an electric seat belt pre-tensioner to help control a seat belt during a collision. In still other embodiments, any systems of a motor vehicle can be controlled using ECU 120. In some embodiments, ECU 120 can be configured with additional ports for communicating with other systems of a motor vehicle, including systems used during a collision. In other embodiments, ECU 120 can be configured to communicate with these systems using a vehicle network. With this arrangement, a collision warning system can be configured to control one or more systems that may be used to help avoid a collision or to increase the safety of one or more occupants during a collision.

Figure 2:
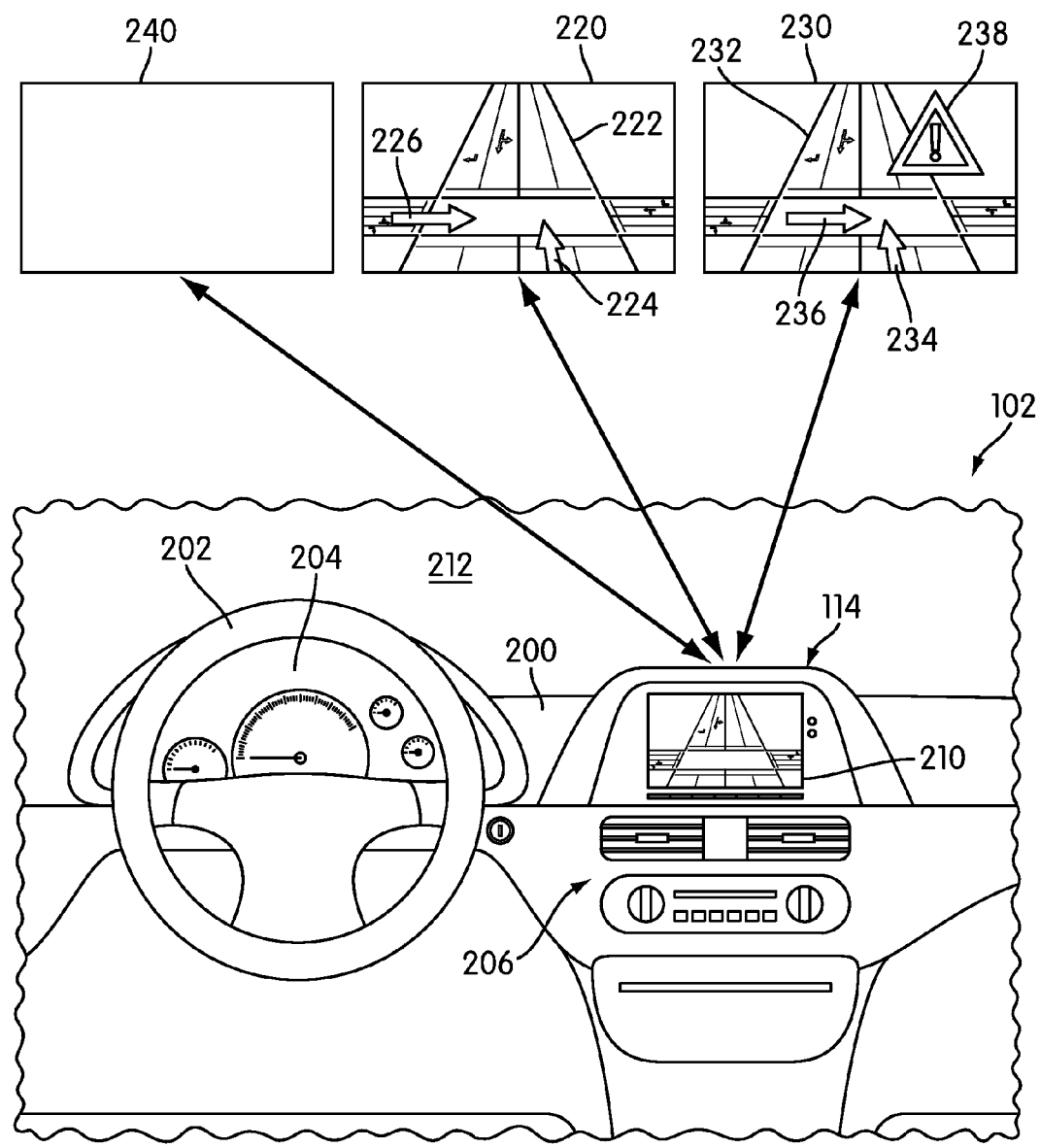
FIG. 2 is a schematic view of an embodiment of alert images for a collision warning system.

FIG. 2 illustrates an embodiment of dashboard 200 for motor vehicle 102. Dashboard 200 may include steering wheel 202 and instrument panel 204. In some embodiments, dashboard 200 can further include center portion 206. In some cases, center portion 206 can include one or more devices associated with an interior of a motor vehicle. Examples include, but are not limited to: audio devices, video devices, navigation devices, as well as any other types of devices. In addition, center portion 206 can be associated with controls for one or more systems of motor vehicle 102 including, but not limited to: climate control systems and other types of systems.

A motor vehicle can include provisions for displaying information from a collision warning system. In some embodiments, a motor vehicle can include a display device of some kind. In some cases, a motor vehicle can include a video screen for displaying information from a collision warning system. Examples of display devices include, but are not limited to: LCDs, CRTs, ELDs, LEDs, OLEDs, as well as other types of displays. In other cases, a display device could be a projection type display device that is configured to project an image onto one or more surfaces of motor vehicle 102. It will be understood that a display device may not be limited to a video screen or projection type display device.

In one embodiment, motor vehicle 102 can include display device 210. In some cases, display device 210 may be associated with driver vehicle interface 114 of collision warning system 100. In particular, display device 210 may be configured to present visual information received from collision warning system 100. In an exemplary embodiment, display device 210 may be an LCD screen.

In some embodiments, display device 210 can be disposed within center portion 206. However, it will be understood that in other embodiments, display device 210 can be located in any portion of motor vehicle 102 as long as display device 210 can be viewed by a driver. For example, in another embodiment, display device 210 may be a projection type device that displays an image onto front window 212. In addition, while display device 210 can be configured to present visual information received from collision warning system 100, display device 210 may be shared with other devices or systems within motor vehicle 100. For example, display device 210 could also be used as a screen for a navigation system.

It will be understood that in some embodiments, a driver vehicle interface can include additional provisions beyond a display screen. For example, in another embodiment, a driver vehicle interface can also be associated with one or more input devices that allow a driver to control various aspects of a collision warning system. In some cases, a driver vehicle interface can include an on/off button for turning a collision warning system on and off. In still another embodiment, a driver vehicle interface can be associated with speakers for generating auditory information.

A display device for a collision warning system can be configured to display one or more images associated with various types of alerts of the collision warning system. For purposes of clarity, the following detailed description discusses a collision warning system utilizing two distinct alert types: informing alerts and warning alerts. In particular, informing alerts are used to inform a driver of nearby vehicles or objects that could pose potential problems. In contrast, a warning alert may be issued to warn the driver of a serious threat of collision with a nearby vehicle or object. In other words, informing alerts inform a driver of low level collision threats, while warning alerts inform a driver of high level collision threats. In other embodiments, any other number of alert types can be used. In some cases, three or more alert types could be issued by a collision warning system.

In the exemplary embodiment, collision warning system 100 includes informing alert image 220 that is associated with an informational alert. Informing alert image 220 may comprise one or more symbols or icons. In this embodiment, informing alert image 220 includes intersection symbol 222, which indicates an upcoming intersection. In addition, informing alert image 220 includes first arrow 224 and second arrow 226, representing the general location and heading of motor vehicle 102 and an approaching vehicle for which there may some threat of collision. By displaying informing alert image 220, a driver is alerted to a potential collision threat with an approaching vehicle. This information may help a driver to be more aware as motor vehicle 102 approaches the upcoming intersection.

In the exemplary embodiment, collision warning system 100 also includes warning alert image 230 that is associated with a warning alert. Warning alert image 230 may comprise one or more symbols or icons. In a similar manner to informing alert image 220, warning alert image 230 may include intersection symbol 232, first arrow 234 and second arrow 236. These symbols indicate information about an upcoming intersection as well as the speeds and headings of motor vehicle 102 and an approaching vehicle. In addition, warning alert image 230 includes warning symbol 238. The appearance of warning symbol 238 alerts a driver to an immediate threat posed by an approaching vehicle. This information may help a driver to avoid a collision by taking immediate action.

In addition to the two types of alerts discussed above, a display device may be configured to display no image when no alert has been issued by collision warning system 100. In this embodiment, display device 210 displays default screen 240 when no alert is issued. In the exemplary embodiment, default screen 240 is associated with a blank screen of display device 210. However, in embodiments where display device 210 is used for displaying information from other systems, default screen 240 may not be a blank screen. For example, in embodiments where display device 210 is shared between a navigational system and collision warning system 100, display device 210 may continue to display images received from the navigation system until an alert is issued. Likewise, once an alert has expired, display device 240 may return to displaying images from a navigation system.

Although a single image is shown for each type of alert (informing alerts and warning alerts) in the current embodiment, other embodiments can include more than one image for each type of alert. In particular, an arrow used to indicate position and heading of a vehicle can be changed from a straight arrow indicating the intention of a vehicle to pass straight through an intersection to curved arrows in cases where the intention of the vehicle is to turn at the intersection. This arrangement can help to inform a driver as to the intentions of an approaching vehicle. In addition, a three way intersection symbol can be used in place of a four way intersection symbol in cases where the upcoming intersection is a three way intersection. However, in embodiments using multiple images for each type of alert, it will be understood that some distinguishing elements may be used to indicate that an alert is an informing alert or a warning alert. For example, as in the current embodiment, a warning symbol can be used to distinguish between informing alerts and warning alerts. Likewise, in some cases, informing alerts can be associated with a different color than warning alerts. In one embodiment, informing alerts can include symbols or icons colored in yellow, while warning alerts can include symbols or icons colored in red.

FIGS. 3 through 6 illustrate embodiments of a collision warning system in use. As previously discussed, motor vehicle 102 includes collision warning system 100. In particular, motor vehicle 102 includes provisions for communicating with one or more vehicles using a vehicle communication network. Also, motor vehicle 102 includes provisions for alerting a driver of potential collisions using either informing alerts or warning alerts.

Figure 3:
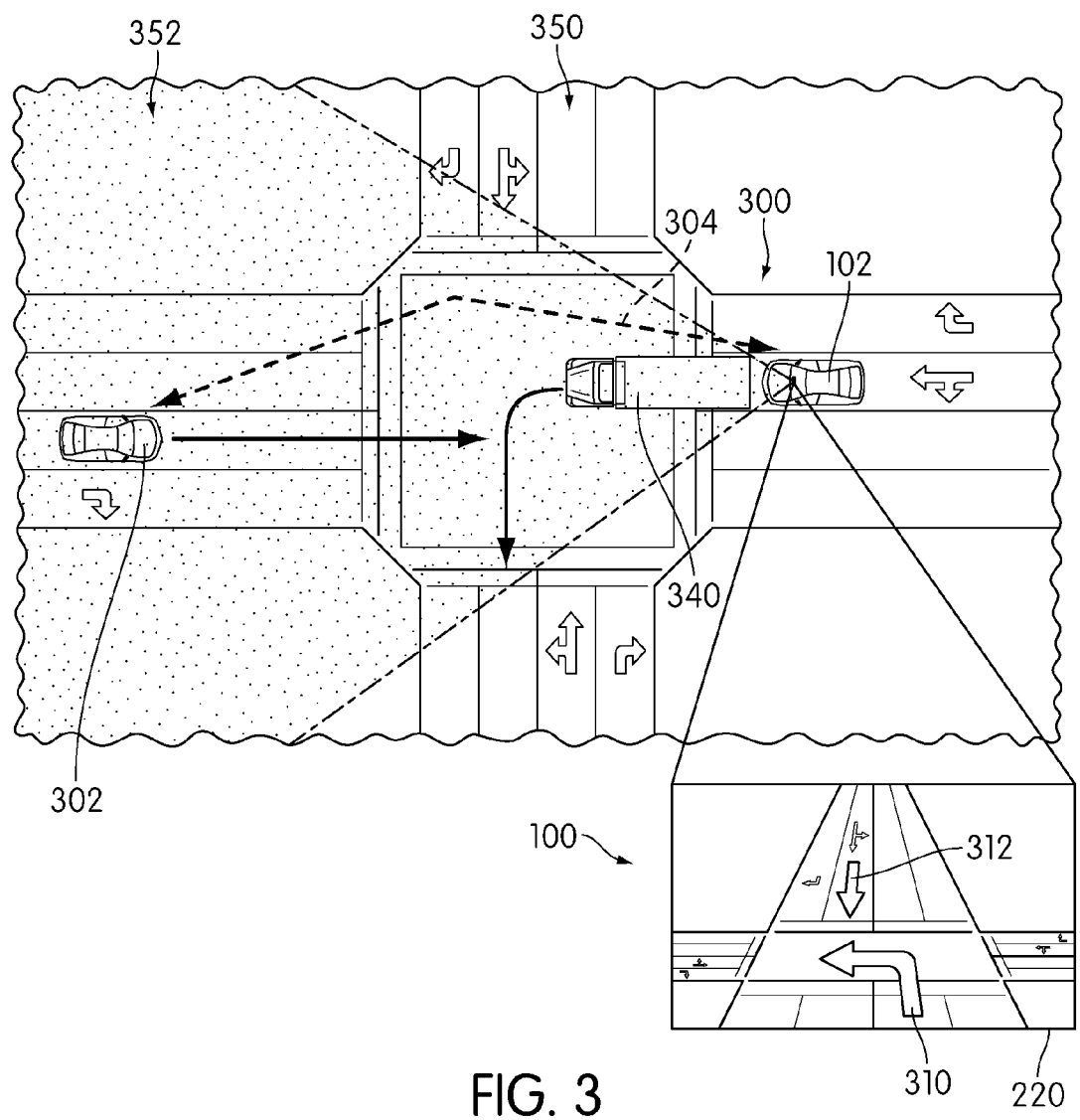
FIG. 3 is a schematic view of an embodiment of a collision warning system displaying an informing alert image.

Referring to FIG. 3, motor vehicle 102 is in communication with target vehicle 302 using vehicle communication network 304. The term "target vehicle" as used throughout this detailed description and in the claims refers to any vehicle about which a collision warning system could issue an alert. Furthermore, for clarity, a vehicle possessing a collision warning system may be referred to as a "subject vehicle", in contrast to the target vehicle. In particular, motor vehicle 102 is the subject vehicle in this embodiment.

In some cases, vehicle communication network 304 may be a DSRC network, as discussed above. In particular, using vehicle communication network 304, motor vehicle 102 and target vehicle 302 may be configured to exchange various types of information including, but not limited to: vehicle position, vehicle speed, vehicle trajectory as well as other types of vehicle information. In addition, any type of basic safety message (BSM) can be exchanged via vehicle communication network 304.

In an exemplary embodiment, each vehicle operating on vehicle communication network 304 is presumed to have a GPS antenna to determine vehicle locations. Using vehicle location information, velocities and headings for each vehicle can also be computed. In some cases, target vehicle 302 may simply transmit a current GPS position and motor vehicle 102 may calculate speed and heading according to the current GPS position. In other cases, target vehicle 302 can transmit each of these values independently.

In this embodiment, after receiving attributes from target vehicle 302, collision warning system 100 may determine if an alert should be issued. Since motor vehicle 102 is planning to make a left turn at intersection 300 and target vehicle 302 is planning to pass straight through intersection 300, there is potentially a threat of collision. In this case, collision warning system 100 issues an informing alert using informing alert image 220. Informing alert image 220 may include first arrow 310 and second arrow 312, indicating the planned trajectories of motor vehicle 102 and target vehicle 302, respectively. By displaying informing alert image 220, collision warning system 100 can inform a driver of motor vehicle 102 to a potential threat posed by target vehicle 302.

Figure 4:
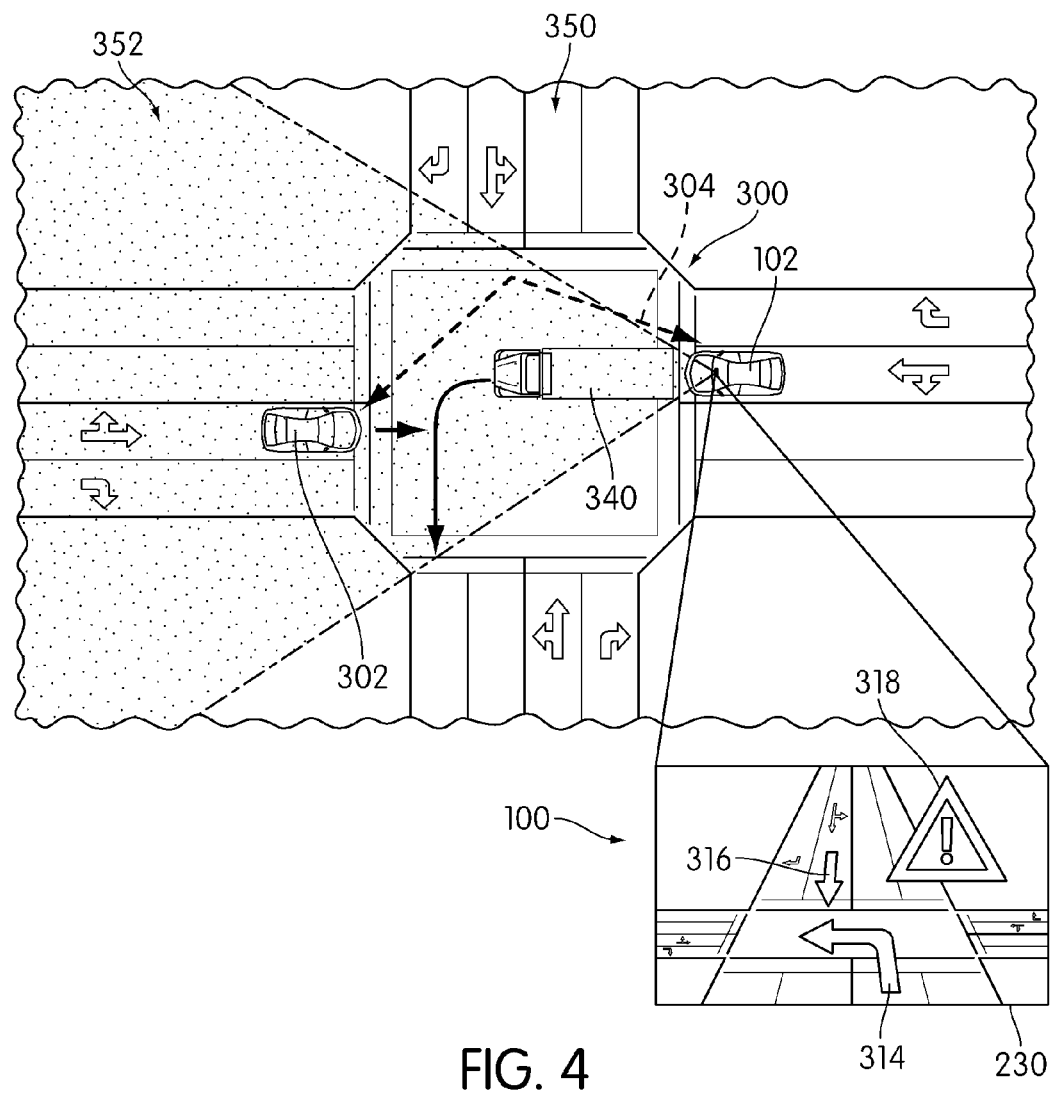
FIG. 4 is a schematic view of an embodiment of a collision warning system displaying a warning alert image.

Referring to FIG. 4, at a later time, target vehicle 302 is just about to enter intersection 300. At this point, collision warning system 100 may determine that the threat of collision is very high. In this case, collision warning system 100 issues a warning alert using warning alert image 230. Warning alert image 230 includes first arrow 314 and second arrow 316, indicating the planned trajectories of motor vehicle 102 and target vehicle 302, respectively. In contrast to the informing alert image illustrated in FIG. 3, warning alert image 230 also includes warning symbol 318, which indicates a serious threat of collision. By displaying warning alert image 230, collision warning system 100 can warn the driver of motor vehicle 102 to a serious collision threat posed by target vehicle 302. This warning may allow the driver to alter the current planned trajectory in order to avoid a collision.

In some cases, a driver may feel that a collision warning system issues too many alerts, especially informing alerts which may inform the driver about situations already known to the driver. For example, in situations where a driver has good line of sight of a target vehicle, an informing alert displaying the location and trajectory of the target vehicle may be seen as a nuisance. Some drivers may choose to deactivate a collision warning system rather than put up with these "nuisance alerts."

A collision warning system can include provisions for reducing the number of alerts issued to a driver. In some embodiments, a collision warning system can be configured to prevent informing alerts from being issued when a driver has good line of sight to a target vehicle. In some cases, a collision warning system can be configured to operate in two or more alert modes. A first alert mode may be used when the driver has good line of sight of a target vehicle. A second alert mode may be used when the driver does not have line of sight of a target vehicle. In an exemplary embodiment, the first alert mode may be referred to as a normal alert mode. The second alert mode may be referred to as an enhanced alert mode. Furthermore, during the normal alert mode, a collision warning system may issue less warnings since a driver can see the target vehicle clearly. In contrast, the enhanced alert mode may be associated with a higher frequency of issued alerts, since the driver cannot see the target vehicle, and thus could benefit from additional information to avoid potential collisions.

Referring to FIGS. 3 and 4, motor vehicle 102 is situated behind truck 340. Because of this arrangement, the line of sight from within motor vehicle 102 is reduced. For purposes of illustration, intersection 300 and the surrounding area is divided into visible region 350 and non-visible region 352. In other words, from within motor vehicle 102 a driver is able to see everything located within visible region 350, but the driver is unable to see objects located within non-visible region 352, due to the presence of truck 340 in front of motor vehicle 102. Since target vehicle 302 is within non-visible region 352, a driver inside of motor vehicle 102 cannot see target vehicle 302. In addition, a direct communication path between subject vehicle 102 and target vehicle 302 is obstructed by truck 240. However, by using the reflection wave path or the diffraction wave path of a communication signal, vehicle communication network 304 may still be established. In this situation, collision warning system 100 is operated in the enhanced alert mode. In particular, as discussed above, displaying informing alert image 220 gives a driver useful information about target vehicle 302 that is not considered a nuisance. In a similar manner, as target vehicle 302 gets closer to intersection 300, collision warning system 100 issues warning alert image 230. In this situation, a driver may not be aware of an impending collision since target vehicle 302 is located within non-visible region 352 and is not in the line of sight of the driver.

Figure 5:
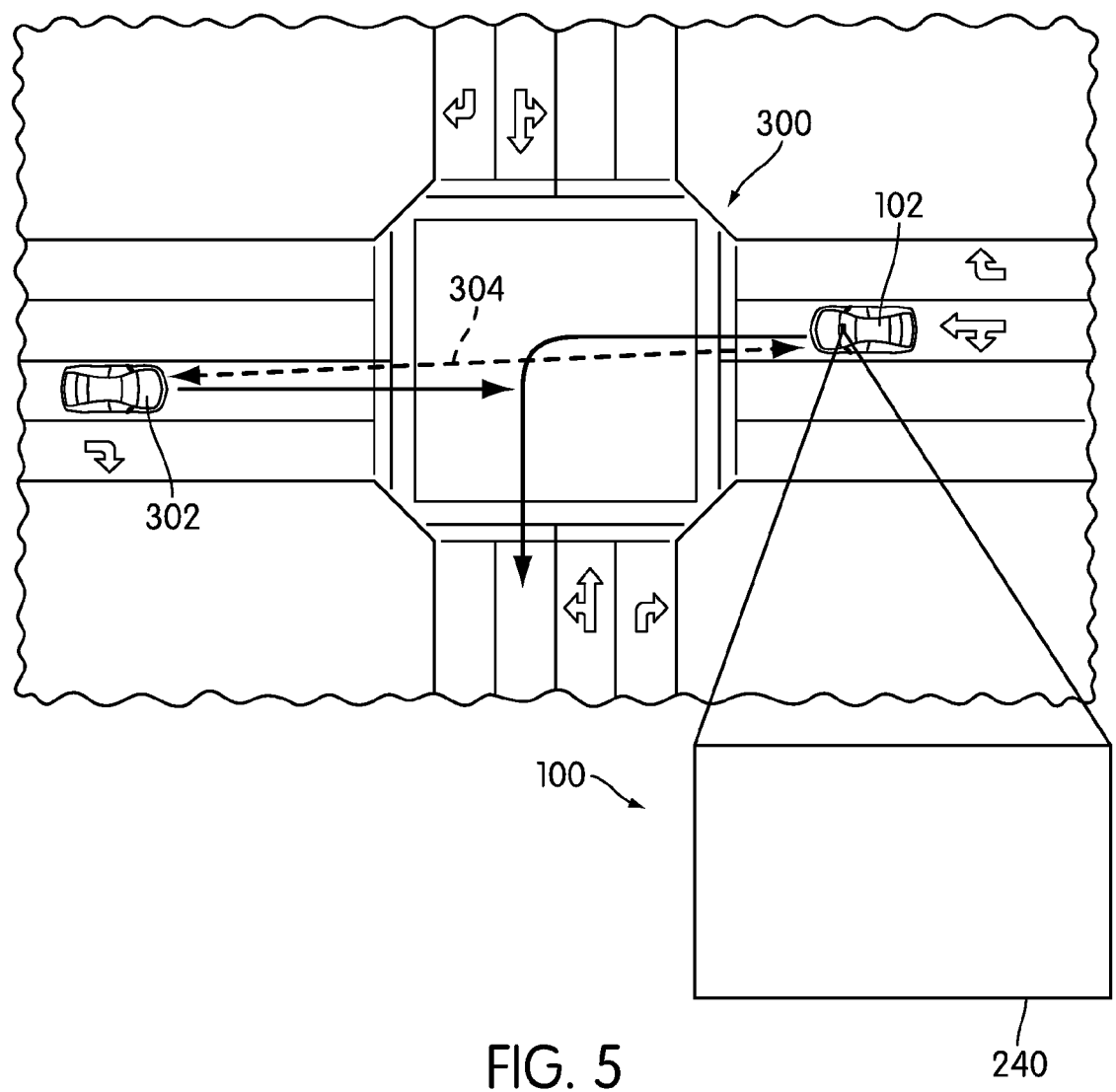
FIG. 5 is a schematic view of an embodiment of a collision warning system displaying a default screen.
Figure 6:
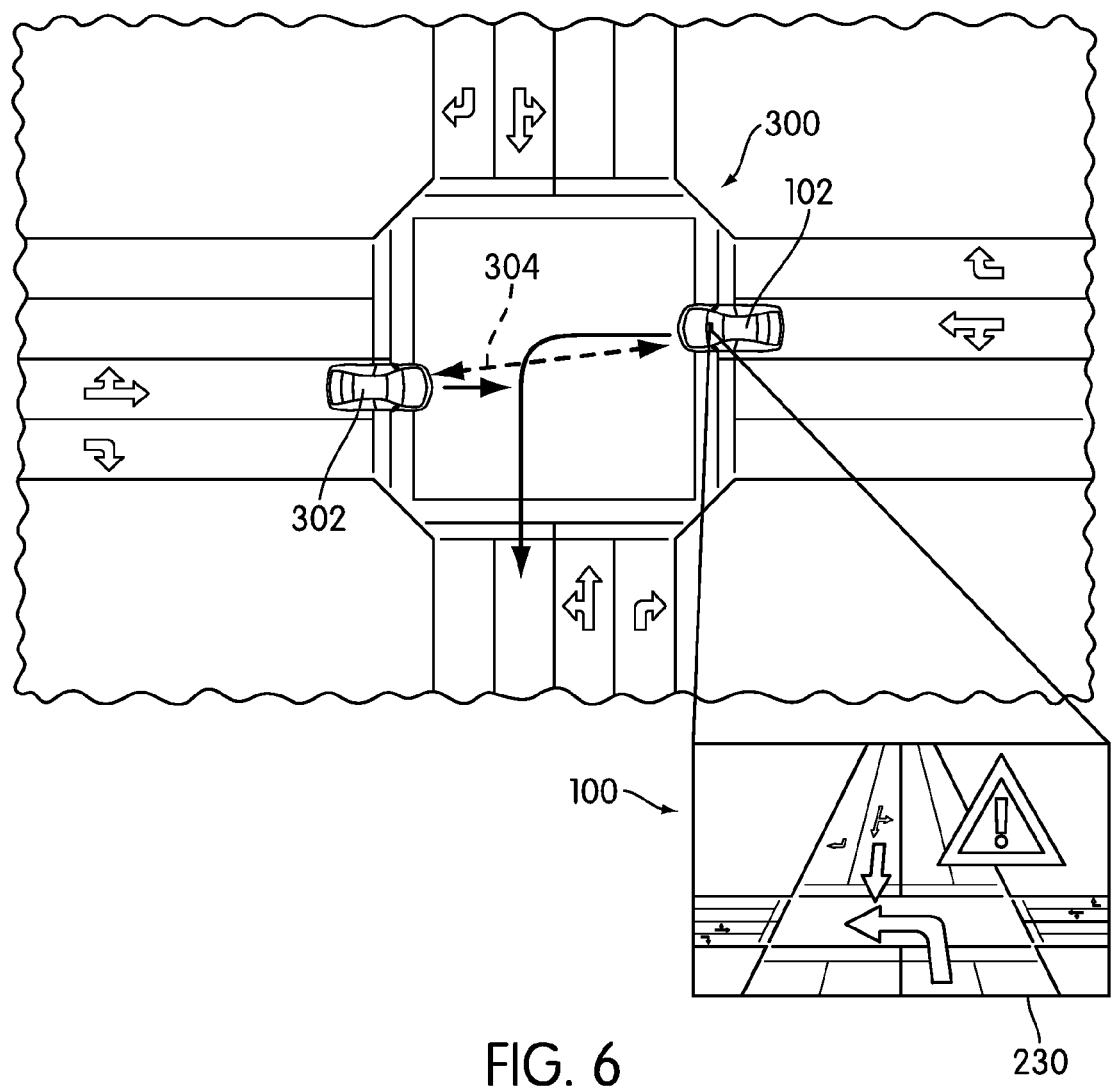
FIG. 6 is a schematic view of an embodiment of a collision warning system displaying a warning alert image.

In contrast, FIGS. 5 and 6 illustrate embodiments of collision warning system 100 operating in a normal alert mode. In this case, the line of sight of motor vehicle 102 is not obstructed. Also, in this case, vehicle communication network 304 is established using a direct wave path. In particular, a driver within motor vehicle 102 can see target vehicle 302. In this situation, collision warning system 100 may determine that the driver has good line of sight of target vehicle 302 and therefore no informing alert is necessary. In the exemplary embodiment, default image 240 is shown on a display screen associated with collision warning system.

As seen in FIG. 6, as target vehicle 302 enters intersection 300, collision warning system may determine that the threat of a collision is very high. Therefore, at this point, collision warning system 100 may issue warning alert image 230 even though the driver has good line of sight of target vehicle 302.

With the arrangement discussed here, the number of alerts issued by a collision warning system can be modified according to the line of sight conditions. In particular, during normal alert mode, the collision warning system only issues warning alerts. In other words, the collision warning system only issues alerts when the threat of collision is high. In contrast, during the enhanced alert mode, the collision warning system may issue both informing alerts and warning alerts. This arrangement can help prevent deactivation of a collision warning system from annoyed drivers.

As discussed above, communications between two vehicles can be established using direct paths as well as reflection wave paths or diffraction wave paths. In particular, direct paths for signals associated with a vehicle communication network may be used when two vehicles have line of sight of one another. In addition, reflection wave paths or diffraction wave paths for signals associated with a vehicle communication network may be used when there is not good line of sight between vehicles, since a direct path may be obstructed by one or more objects in such cases. With this arrangement, a vehicle communication network can be established during both good line of sight conditions and non-line of sight conditions.

Figure 7:
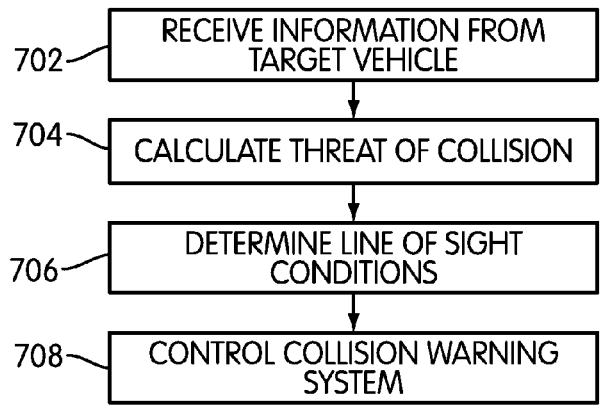
FIG. 7 is an embodiment of a process for controlling a collision warning system.

FIG. 7 illustrates an embodiment of a process for operating a collision warning system. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 702, ECU 120 may receive information from a target vehicle. In some cases, the information can be received from a vehicle communication network, such as a DSRC network. The information can include, in some cases, the location, speed and heading of the target vehicle. In other cases, additional information about the target vehicle can be received, including vehicle make, vehicle model, size information, shape information as well as other types of information about the target vehicle.

Next, during step 704, ECU 120 can calculate the threat of a collision. In some embodiments, the threat of collision can be associated with two or more discrete threat levels. In some cases, the threat of collision can be associated with "no threat," "low threat" or "high threat" levels. In other cases, the threat of collision can be associated with additional threat levels. In other embodiments, the threat of collision can be associated with a continuous value. For example, the threat of collision can be a value between 0 and 100, with 0 being no threat and 100 being the highest threat level. For purposes of clarity, the following detailed description discusses an embodiment utilizing the three discrete threat levels discussed above.

Following step 704, ECU 120 can proceed to step 706. During step 706, ECU 120 can determine the line of sight conditions for the driver of the motor vehicle. In particular, during step 706, ECU 120 can determine that the driver has line of sight of the target vehicle or that the driver does not have line of sight of the target vehicle.

Finally, during step 708, ECU 120 can control the collision warning system. In some cases, ECU 120 can use the threat of a collision and the line of sight conditions to determine whether or not to issue an alert as well as to determine what type of alert to issue.

Figure 8:
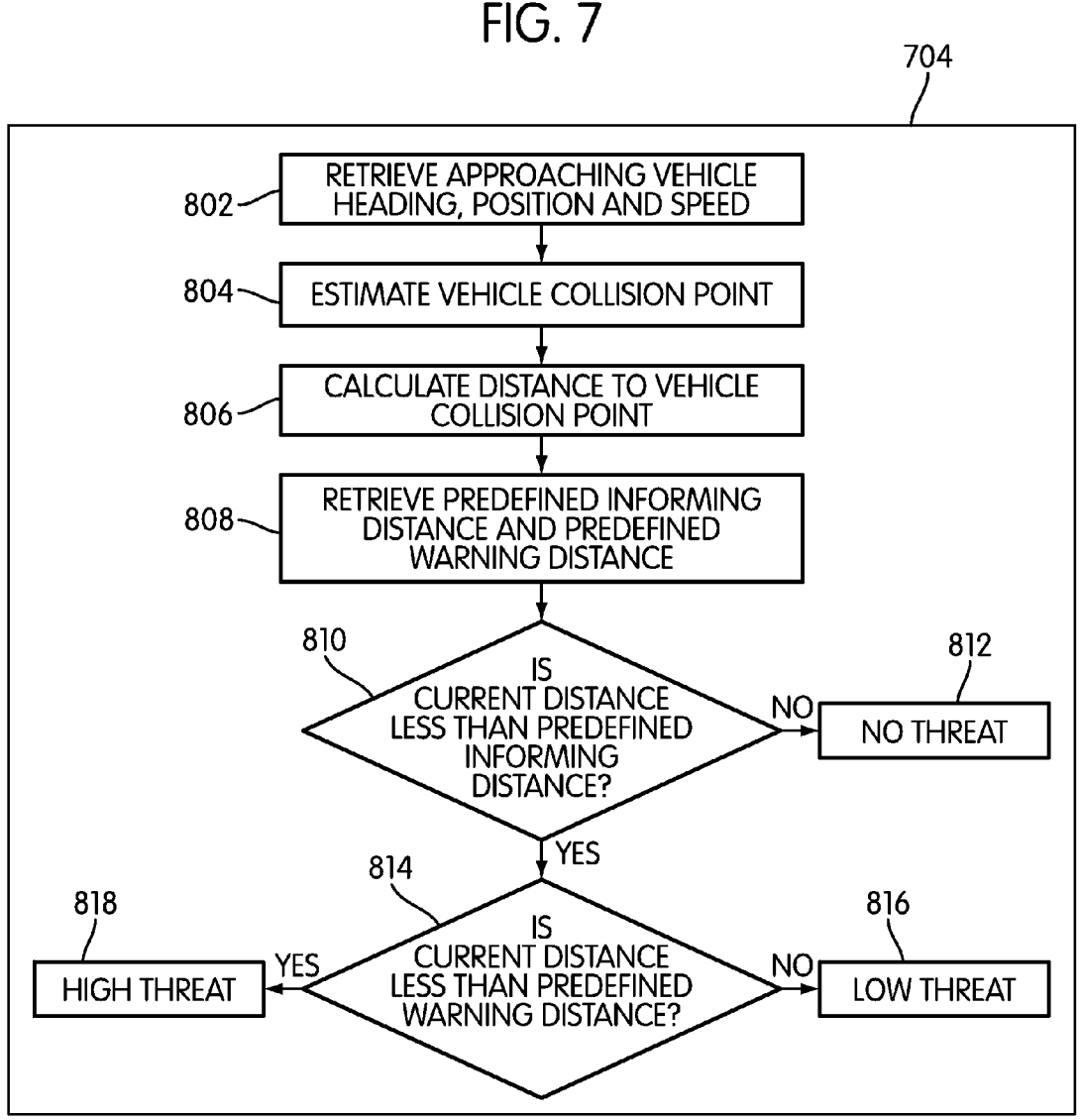
FIG. 8 is an embodiment of a process for calculating a threat of collision between a motor vehicle and a target vehicle.

FIG. 8 illustrates an embodiment of a process for calculating the threat of collision. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 802, ECU 120 can retrieve the heading, position and speed of a target vehicle using a vehicle communication network. Next, during step 804, ECU 120 may estimate a vehicle collision point. The term "vehicle collision point" refers to a point at which the motor vehicle and the target vehicle would collide given current headings, positions and speeds for both vehicles. In addition, ECU 120 may use other available information for estimating a vehicle collision point, such as the intention of one or both drivers to turn at an upcoming intersection.

Following step 804, ECU 120 may proceed to step 806. During step 806, ECU 120 may calculate the distance to the vehicle collision point. At this point, ECU 120 proceeds to step 808. During step 808, ECU 120 retrieves a predefined informing distance and a predefined warning distance. In other words, the predefined informing distance is a distance from the vehicle collision point within which the collision warning system may determine that there is a low threat of collision. Likewise, the predefined warning distance is a distance from the vehicle collision point within which the collision warning system may determine that there is a high threat of collision.

Following step 808, ECU 120 may proceed to step 810. During step 810, ECU 120 may determine if the current distance to the vehicle collision point is less than the predefined informing distance. If ECU 120 determines that the current distance to the vehicle collision point is not less than the predefined informing distance, ECU 120 may proceed to step 812, where ECU 120 determines that there is no threat. Otherwise, ECU 120 proceeds to step 814.

During step 814, ECU 120 determines if the current distance to the vehicle collision point is less than the predefined warning distance. If ECU 120 determines that the current distance to the vehicle collision point is not less than the predefined warning distance, ECU 120 may proceed to step 816. During step 816, ECU 120 determines that there is a low threat level. If, during step 814, ECU 120 determines that the current distance to the vehicle collision point is less than the predefined warning distance, ECU 120 proceeds to step 818. During step 818, ECU 120 determines that there is a high threat level.

It will be understood that the current embodiment of a process for determining a threat of collision is only intended to be exemplary. Generally, any method of determining a threat level according to information related to a primary vehicle and a target vehicle may be used. In other embodiments, a collision warning system can use another process for determining a threat of collision. For example, in another embodiment, rather than calculating a distance to the vehicle collision point, a time to vehicle collision point can be calculated and compared with a predefined informing alert time as well as a predefined warning alert time.

Figure 9:
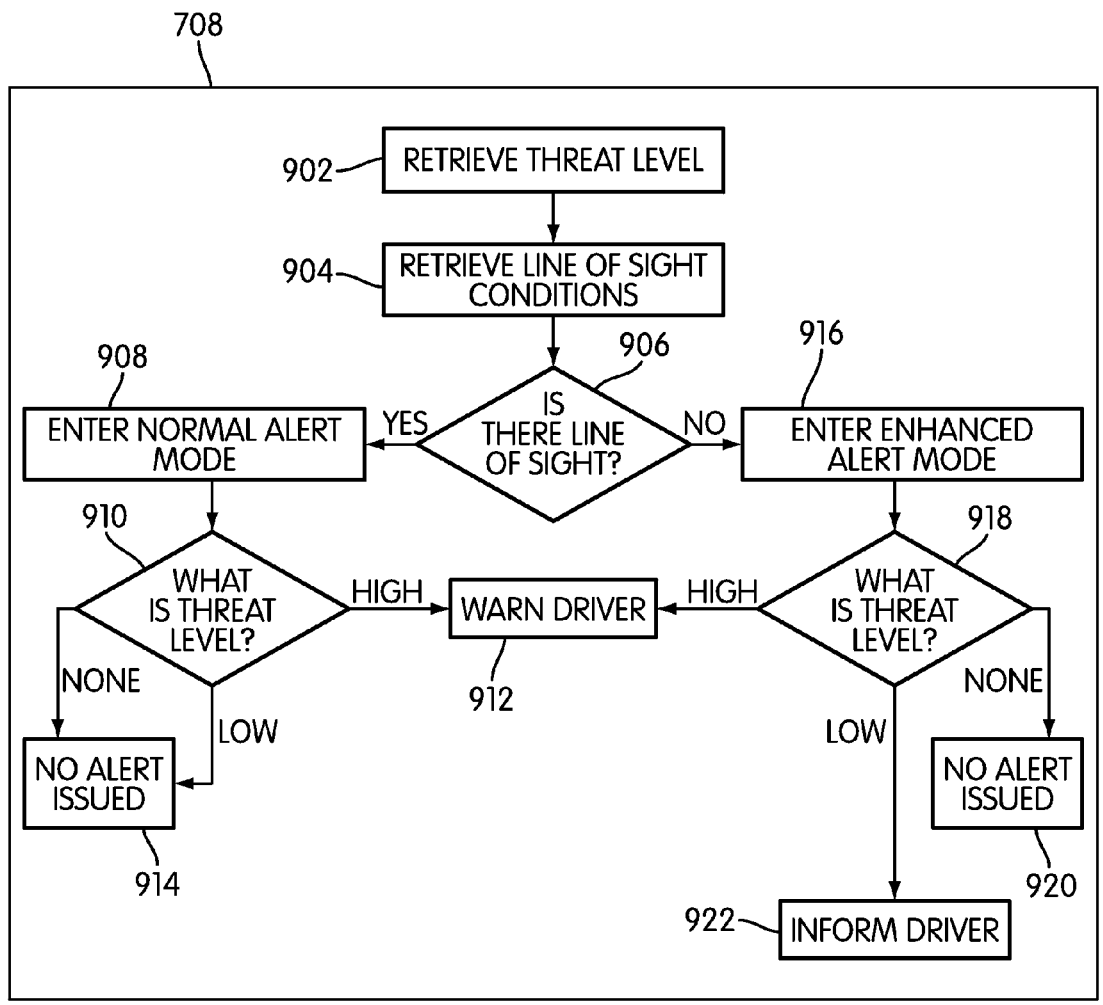
FIG. 9 is an embodiment of a process for controlling a collision warning system.

FIG. 9 illustrates an embodiment of a process for operating collision warning system 100. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 902, ECU 120 may receive the threat level. In some cases, the threat level may be calculated using the method discussed above. Next, ECU 120 may receive the line of sight conditions during step 904. In particular, ECU 120 can determine if a target vehicle is within the line of sight of a driver.

Following step 904, ECU 120 can proceed to step 906. During step 906, ECU 120 may determine if there is line of sight according to the line of sight conditions received during step 904. If there is line of sight, ECU 120 may proceed to step 908. During step 908, ECU 120 puts collision warning system 100 in a normal alert mode.

Following step 908, ECU 120 can proceed to step 910. During step 910, ECU 120 determines the threat level according to the threat level received during step 902. If, during step 910, ECU 120 determines that the threat level is high, ECU 120 proceeds to step 912, where a warning alert is issued. Otherwise, if ECU 120 determines that the threat level is low or that there is no threat, ECU 120 proceeds to step 914. During step 914, no alert is issued.

Returning to step 906, if ECU 120 determines that there is no line of sight, ECU 120 may proceed to step 916. During step 916, ECU 120 puts collision warning system 100 in an enhanced alert mode. In particular, the enhanced alert mode is a mode of collision warning system 100 associated with a high frequency of informing alerts due to the inability of the driver to see the target vehicle.

Following step 916, ECU 120 can proceed to step 918. During step 918, ECU 120 determines the threat level according to the threat level received during step 902. If, during step 918, ECU 120 determines that there is no threat, ECU 120 proceeds to step 920, where no alert is issued. If, during step 920, ECU 120 determines that there is a low threat, ECU 120 may proceed to step 922, where an informing alert is issued. If, during step 920, ECU 120 determines that the threat level is high, ECU 120 proceeds to step 912, where a warning alert is issued.

A collision warning system can include provisions for determining line of sight conditions for a target vehicle. In some embodiments, the collision warning system can use information associated with a vehicle communication network to determine line of sight conditions. In an exemplary embodiment, the collision warning system can use characteristics of a received signal associated with a vehicle communication network.

Figure 10:
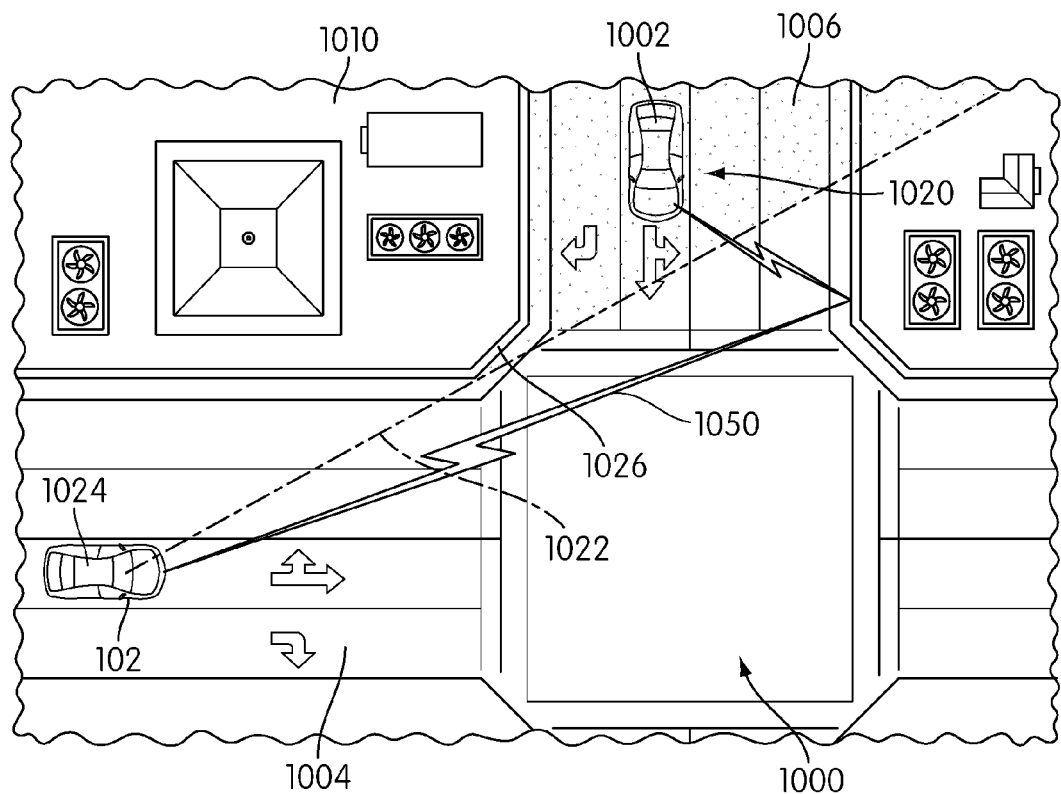
FIG. 10 is a schematic view of an embodiment of a signal being degraded by an obstructing building.
Figure 11:
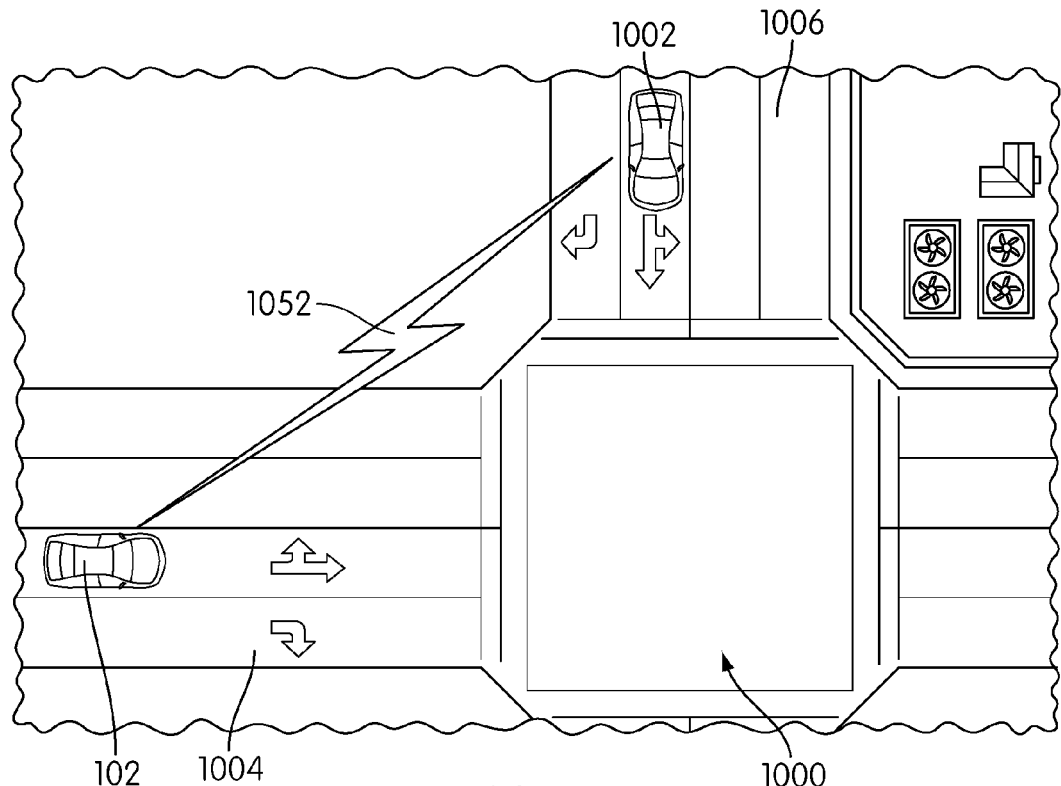
FIG. 11 is a schematic view of an embodiment of a signal being preserved.

FIGS. 10 and 11 illustrate a schematic embodiment of a method of determining line of sight conditions by measuring signal characteristics associated with a vehicle communication network. Referring to FIGS. 10 and 11, motor vehicle 102 is approaching intersection 1000 along first street 1004. In addition, target vehicle 1002 is approaching intersection 1000 along second street 1006.

Referring to FIG. 10, building 1010 is disposed at the corner of first street 1004 and second street 1006. In this case, the line of sight of a driver within motor vehicle 102 is obscured by building 1010. In particular, a driver within motor vehicle 102 is unable to see anything inside of non-visible region 1020, whose boundary is defined by axis 1022 extending from front window 1024 of motor vehicle 102 and tangential to building corner 1026. In this situation, a driver within motor vehicle 102 is unable to see target vehicle 1002.

In this exemplary embodiment, motor vehicle 102 and target vehicle 1002 may be in communication via a vehicle communication network, as discussed above. In particular, motor vehicle 102 and target vehicle 1002 may be constantly transmitting information to, and receiving information from, one another in the form of wireless signals. In this case, target vehicle 1002 transmits signal 1050 to motor vehicle 102.

Due to the presence of building 1010, signal 1050 may be substantially degraded. In an exemplary embodiment, a collision warning system can measure the degradation of signal 1050 in order to determine if an object is disposed between motor vehicle 102 and target vehicle 1002. In this case, due to the signal degradation caused by building 1010, the collision warning system can determine that motor vehicle 102 does not have line of sight with respect to target vehicle 1002.

In contrast, FIG. 11 illustrates an embodiment without a building at the corner of first street 1004 and second street 1006. In this case, a driver within motor vehicle 102 has full line of sight and is able to see target vehicle 1002. Additionally, signal 1052 transmitted by target vehicle 1002 and received at motor vehicle 102 is not degraded since there is no obstruction. In this case, the lack of any substantial signal degradation can be used by the collision warning system to determine that motor vehicle 102 does have line of sight with respect to target vehicle 1002.

Figure 12:
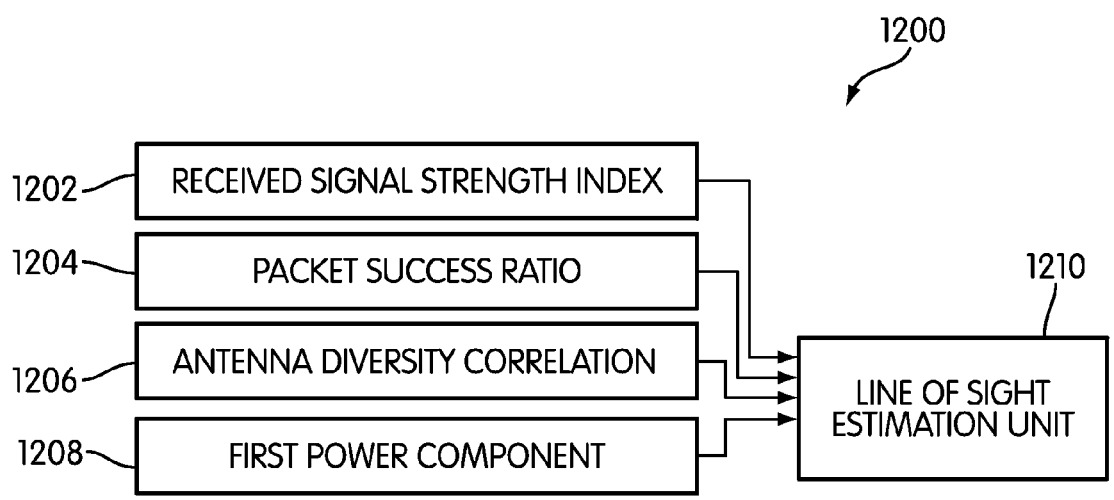
FIG. 12 is a schematic view of an embodiment of a line of sight estimation system.

FIG. 12 illustrates an exemplary embodiment of a set of signal characteristics that can be used to estimate line of sight for a motor vehicle with respect to another vehicle. In different embodiments, different signal characteristics can be used for estimating line of sight. The term "signal characteristic" as used throughout this detailed description and in the claims refers to any measurable characteristic of an electromagnetic signal. Furthermore, the term "signal degradation" refers to any measurable change in one or more signal characteristics. It will be understood that the following signal characteristics are exemplary and are not meant to be limiting.

In some embodiments, line of sight estimation system 1200 includes first signal characteristic 1202, second signal characteristic 1204, third signal characteristic 1206 and fourth signal characteristic 1208. In the exemplary embodiment, first signal characteristic 1202 is associated with the received signal strength index (RSSI) of a signal. The RSSI is a measurement of the power present in a received radio signal. In some cases, RSSI measurements may be unit-less in the range between 0 and 255. In an exemplary embodiment, signal degradation associated with the RSSI can be computed by comparing a reference RSSI stored in memory, as a function of distance to the transmitting vehicle, to a measured RSSI of the actual transmission. If the actual RSSI is substantially below the reference RSSI value, the collision warning system may assume non line of sight conditions due to an obstruction blocking the signal or otherwise reflecting the signal. If, however, there is no substantial degradation between the measured RSSI and the reference RSSI, the collision warning system can assume there is line of sight.

Second signal characteristic 1204 may be associated with the packet success ratio (PSR) of a signal. The PSR may be a measure of the number of packets received divided by the total number of packets transmitted. In some cases, the PSR ratio may be given as a percentage or as a fraction between 0 and 1. In an exemplary embodiment, signal degradation associated with the PSR can be computed by comparing a reference PSR value stored in memory, as a function of distance to the transmitting vehicle, with a measured PSR of the actual transmission. If the measured PSR value is substantially below the reference PSR value, the collision warning system may assume non line of sight conditions due to an obstruction blocking the signal or otherwise reflecting the signal. If, however, there is no substantial degradation between the measured PSR and the reference PSR, the collision warning system can assume there is line of sight.

Third signal characteristic 1206 may be associated with an antenna diversity correlation between two or more receiving antennas. Generally, the receiving antennas can be any types of antennas capable of transmitting any types of signals. In one embodiment, the antennas may be associated with other nodes of a vehicle communication network. For unobstructed line of sight communication, the correlation between the signals coming from the two receiving antennas (some distance apart) may be stronger compared to obstructed line of sight communication. In an exemplary embodiment, signal degradation associated with antenna diversity correlation can be computed by comparing a reference antenna diversity correlation value stored in memory with a measured antenna diversity correlation value. If the measured antenna diversity correlation value is substantially below the reference antenna diversity correlation value, the collision warning system may assume non line of sight conditions due to an obstruction blocking the signal or otherwise reflecting the signal. If, however, there is no substantial degradation between the measured antenna diversity correlation and the reference antenna diversity correlation, the collision warning system can assume there is line of sight.

Fourth signal characteristic 1208 may be associated with the first power component (FPC) of the signal. The FPC characteristic of a signal may be similar to the RSSI of the signal, except that the RSSI is an average of the entire packet, while the FPC is the first reading of the packet. In an exemplary embodiment, signal degradation associated with the FPC can be computed by comparing a reference FPC value stored in memory, as a function of distance to the transmitting vehicle, with a measured FPC of the actual transmission. If the measured FPC value is substantially below the reference FPC value, the collision warning system may assume non line of sight conditions due to an obstruction blocking the signal or otherwise reflecting the signal. If, however, there is no substantial degradation between the measured FPC and the reference FPC, the collision warning system can assume there is line of sight.

In this embodiment, first signal characteristic 1202, second signal characteristic 1204, third signal characteristic 1206, and fourth signal characteristic 1208 are illustrated as inputs to line of sight estimation unit 1210. Generally, any combination of input signal characteristics can be used. In some cases, only a single signal characteristic may be used for estimating line of sight. In other cases, more than one signal characteristic can be used for estimating line of sight. For example, in another embodiment, a line of sight estimation unit may utilize both RSSI and PSR in determining line of sight conditions. In still other cases, four signal characteristics can be used for estimating line of sight.

Figure 13:
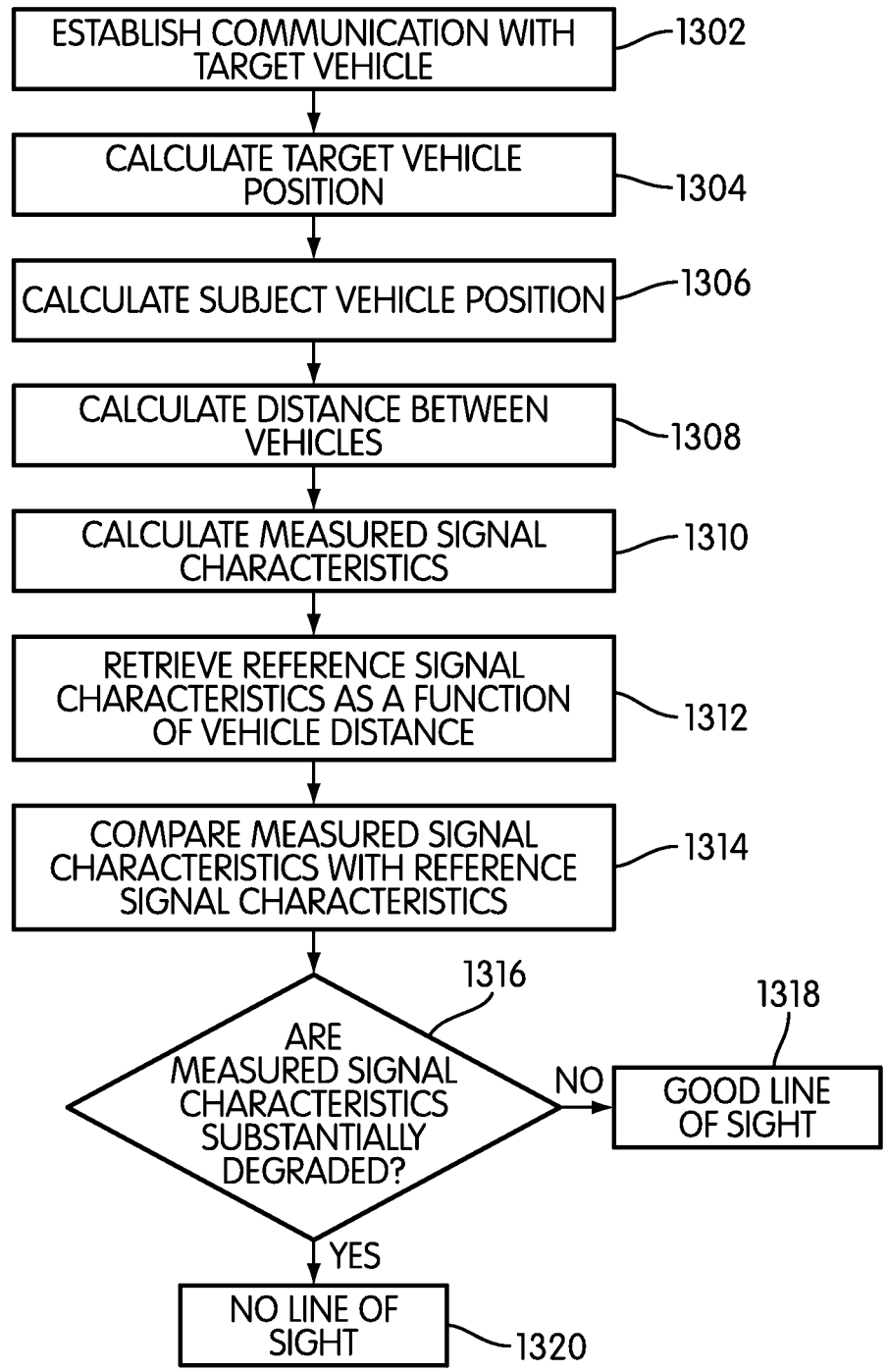
FIG. 13 is an embodiment of a process for determining line of sight conditions for a collision warning system.

FIG. 13 illustrates an exemplary embodiment of a general process for determining line of sight according to a particular signal characteristic. In particular, the process illustrated here may be applied to many different signal characteristics. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 1302, ECU 120 may establish a connection with a target vehicle using a vehicle communication network. Next, during step 1304, ECU 120 may calculate the position of a target vehicle according to information received using the vehicle communication network. For example, in many cases vehicles may transmit current GPS locations. Following step 1304, ECU 120 may calculate or otherwise determine the location of motor vehicle 102, also referred to as the subject vehicle, using information from a GPS receiver, during step 1306. Next, during step 1308, ECU 120 may calculate the relative distance between the target vehicle and motor vehicle 102.

Following step 1308, ECU 120 may proceed to step 1310. During step 1310, ECU 120 may calculate one or more measured signal characteristics. For example, ECU 120 may calculate RSSI, PSR, PDSD and/or FPC, as well as any other measured signal characteristic. Next, during step 1312, ECU 120 can retrieve the reference signal characteristics as a function of the vehicle distance which was calculated during step 1308. The reference signal characteristics will generally be associated with the type of measured signal characteristics. In other words, if the measured signal characteristics include an RSSI value, ECU 120 will retrieve a reference RSSI value. Likewise, ECU 120 will retrieve a reference PSR value for when the measured signal characteristics include a PSR value.

Generally, ECU 120 may use any method for retrieving reference signal characteristics. In some cases, ECU 120 may retrieve the reference signal characteristics as a function of distance to the target vehicle, which was computed during step 1308. This configuration allows for a more accurate comparison to the measured signal characteristics, since some signal degradation occurs with distance even without line of sight obstructions.

At this point, ECU 120 may proceed to step 1314, where the measured signal characteristics are compared with the reference signal characteristics. Following step 1314, ECU 120 may proceed to step 1316. During step 1316, ECU 120 may determine if the measured signal characteristics are substantially degraded according to the comparison made during step 1314. If, during step 1316, ECU 120 determines that the measured signal characteristics are not substantially degraded then ECU 120 may proceed to step 1318, where it is determined that the driver of motor vehicle 102 has line of sight. Otherwise, ECU 120 may proceed to step 1320, where it is determined that the driver of motor vehicle 102 does not have line of sight.

It will be understood that in embodiments using multiple signal characteristics to determine line of sight, it may be possible that some signal characteristics are substantially degraded while other signal characteristics are not substantially degraded. In such embodiments, the overall determination of signal characteristic degradation performed during step 1316 can be accomplished by weighting various signal characteristics.

In the preceding discussion, examples of objects that may obstruct the view of a driver have included vehicles and buildings. However, it will be understood that the provisions for determining line of sight conditions discussed above are not limited to use with any particular type of obstruction. In particular, since any obstructing object may tend to degrade a signal received from a target vehicle, line of sight conditions can be determined using these methods for any type of obstructions.

Figure 14:
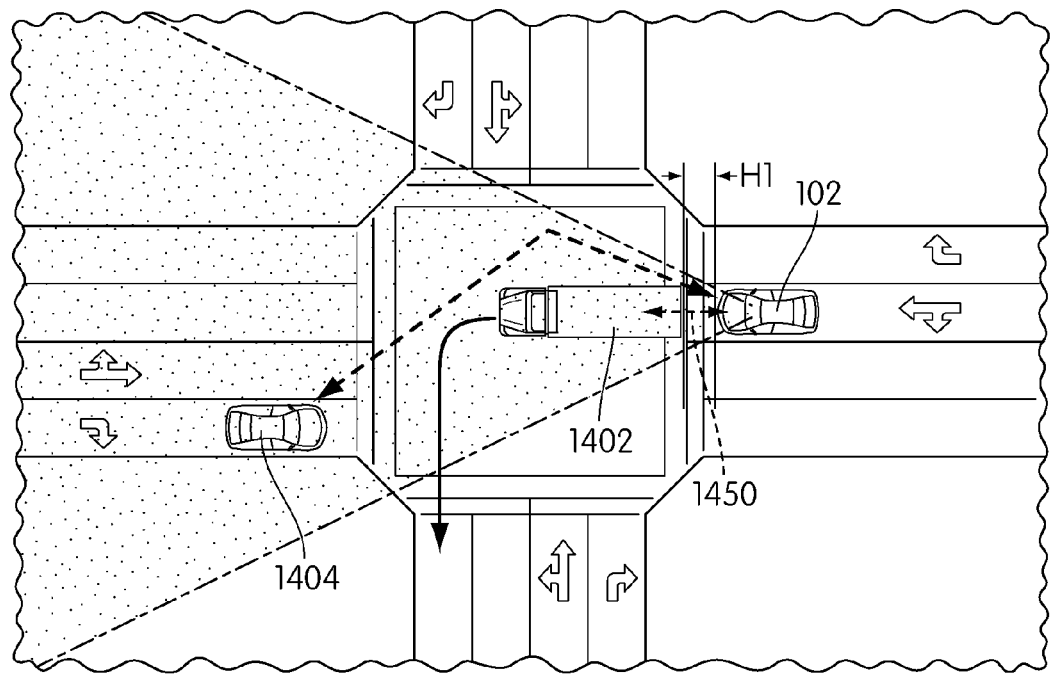
FIG. 14 is a schematic view of an embodiment of a non line of sight condition for a motor vehicle due to the obstruction posed by an intermediate vehicle.
Figure 15:
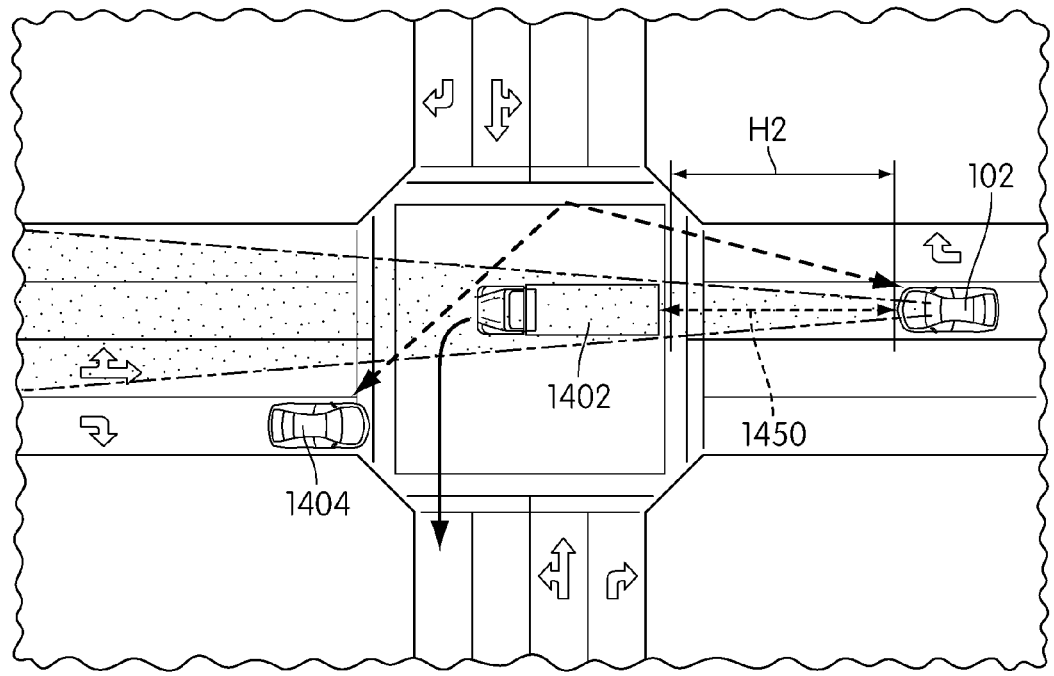
FIG. 15 is a schematic view of an embodiment of a good line of sight condition with respect to a target vehicle.

FIGS. 14 and 15 illustrate an embodiment of another method for determining line of sight using information received from a vehicle communication network. Referring to FIGS. 14 and 15, motor vehicle 102 is disposed behind intermediate vehicle 1402. In an exemplary embodiment, intermediate vehicle 1402 is a truck. In this case, the line of sight of motor vehicle 102 is obstructed by intermediate vehicle 1402. In particular, target vehicle 1404 cannot be seen by a driver of motor vehicle 102.

In cases where line of sight may be obstructed by an intermediate vehicle, a collision warning system can include provisions for determining if a driver has line of sight of a target vehicle using information received from the intermediate vehicle. Referring to FIG. 14, motor vehicle 102 may receive information from intermediate vehicle 1402 by way of vehicle communication network 1450, such as a DSRC network. In some cases, motor vehicle 102 may receive the position of intermediate vehicle 1402. In addition, motor vehicle 102 may be in communication with target vehicle 1404 using vehicle communication network 1450 as well.

After receiving information from intermediate vehicle 1402, collision warning system 100 may determine a headway distance H1 between a front end of motor vehicle 102 and a rearward end of intermediate vehicle 1402. In some cases, headway distance H1 can be estimated using only the position of intermediate vehicle 1402. In other cases, headway distance H1 can be more accurately determined using additional information received from intermediate vehicle 1402 by way of vehicle communication network 1450, including, for example, the length of intermediate vehicle 1402.

At this point, collision warning system 100 can estimate line of sight according to headway distance H1. In particular, referring to FIG. 14, since headway distance H1 is relatively small, collision warning system 100 determines that intermediate vehicle 1402 is close to motor vehicle 102. In this situation, collision warning system 100 may assume intermediate vehicle 1402 obstructs the view of motor vehicle 102. In other words, collision warning system 100 determines that there is not line of sight to target vehicle 1404. In contrast, in the situation illustrated in FIG. 15, since headway distance H2 is relatively large, collision warning system 100 determines that intermediate vehicle 1402 is far ahead from motor vehicle 102. In this situation, collision warning system 100 may assume intermediate vehicle 1402 is not substantially obstructing the view of motor vehicle 102. In other words, collision warning system 100 determines that there is good line of sight to target vehicle 1404. With this arrangement, a collision warning system can estimate line of sight conditions by determining the headway distance between a subject vehicle and an intermediate vehicle that might potentially obstruct the view of a target vehicle.

Figure 16:
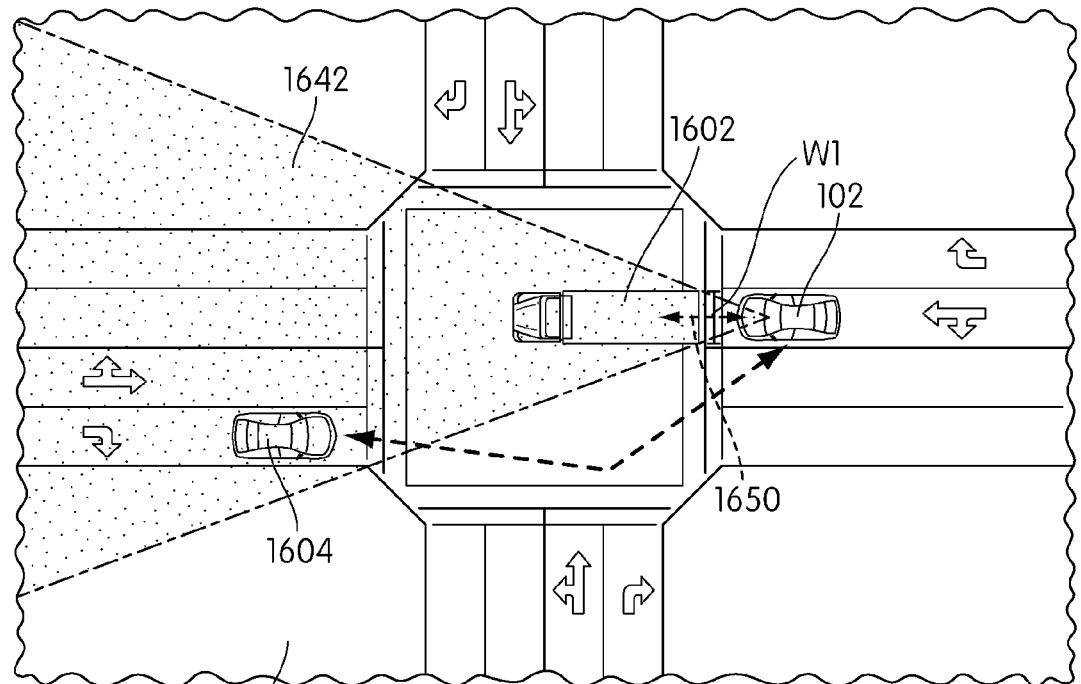
FIG. 16 is a schematic view of an embodiment of a non light of sight condition.

In another embodiment, a collision warning system may include provisions for determining if an intermediate vehicle is obstructing the view of a subject vehicle using information related to a size of the intermediate vehicle. Referring to FIG. 16, intermediate vehicle 1602, in the form of a truck, is disposed just in front of motor vehicle 102. In this case, the large size of intermediate vehicle 1602 obstructs the view of motor vehicle 102. In particular, a driver within motor vehicle 102 is unable to see target vehicle 1604 because of truck 1602. In contrast, referring to FIG. 17, intermediate vehicle 1702, in the form of a small coupe, is also disposed just in front of motor vehicle 102. In this case, intermediate vehicle 1702 does not significantly obstruct the view of motor vehicle 102 due to the small size of intermediate vehicle 1702.

In some cases, collision warning system 100 may be configured to receive information related to the size of an intermediate vehicle. Referring to FIG. 16, collision warning system 100 receives information related to the width of intermediate vehicle 1602 by way of vehicle communication network 1650. In particular, intermediate vehicle 1602 is determined to have a width W1. Since width W1 is relatively large for a vehicle, collision warning system 100 determines that intermediate vehicle 1602 is obstructing the view of motor vehicle 102. In other words, collision warning system 100 determines that motor vehicle 102 does not have line of sight of target vehicle 1604.

Figure 17:
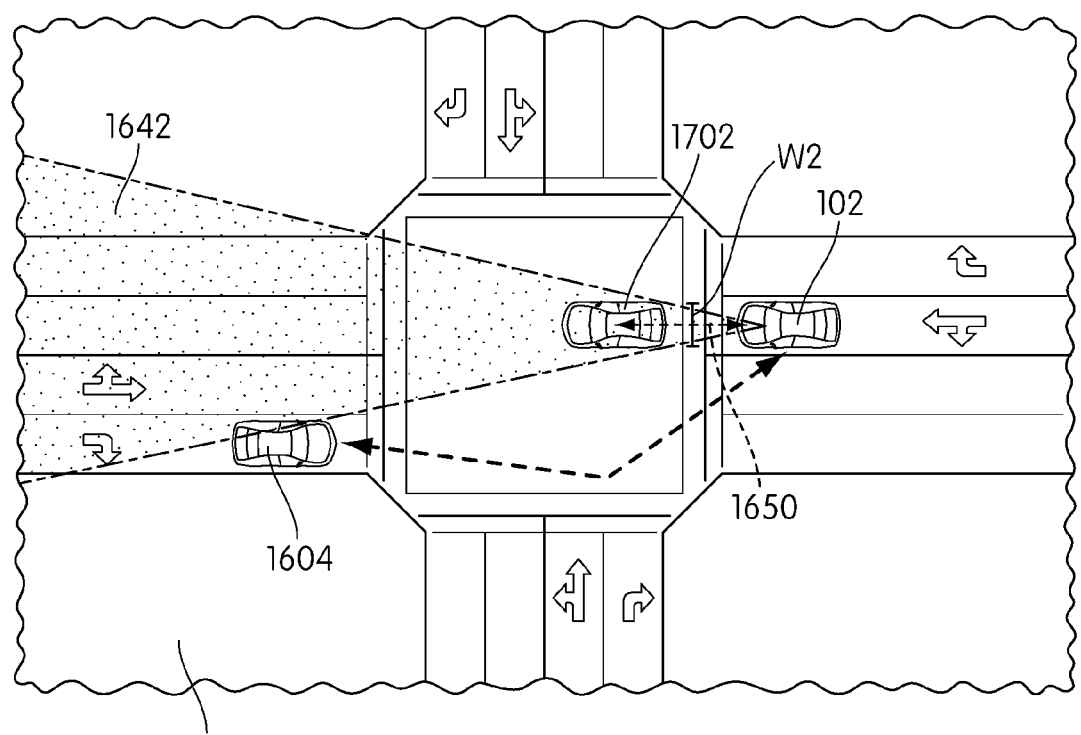
FIG. 17 is a schematic view of an embodiment of a good line of sight condition.

In contrast, referring to FIG. 17, collision warning system 100 receives information about the width of intermediate vehicle 1702. In particular, intermediate vehicle 1702 is determined to have a width W2. Since width W2 is relatively small for a vehicle, collision warning system 100 determines that intermediate vehicle 1702 is not obstructing the view of motor vehicle 102. In other words, collision warning system 100 determines that motor vehicle 102 has good line of sight of target vehicle 1604.

It will be understood that a collision warning system can make use of a combination of various types of information to determine if a subject vehicle has good line of sight of a target vehicle when an intermediate vehicle is present. In some embodiments, a collision warning system can combine information including headway distance between a subject vehicle and an intermediate vehicle, intermediate vehicle size, and target vehicle location to determine if the target vehicle is within the line of sight of the subject vehicle.

For example, referring to FIGS. 16 and 17, collision warning system 100 can estimate visible region 1640 and non-visible region 1642 using the locations of motor vehicle 102 and intermediate vehicle 1602, as well as an estimated size for intermediate vehicle 1602. Furthermore, using the location of target vehicle 1604, collision warning system 100 can determine if target vehicle 1604 is within visible region 1640 or non-visible region 1642. If target vehicle 1604 is determined to be within non-visible region 1642, as seen in FIG. 16, then motor vehicle 102 does not have line of sight of target vehicle 1604. If, however, target vehicle 1604 is determined to be within visible region 1640, as seen in FIG. 17, then motor vehicle 102 does have line of sight of target vehicle 1604.

Figure 18:
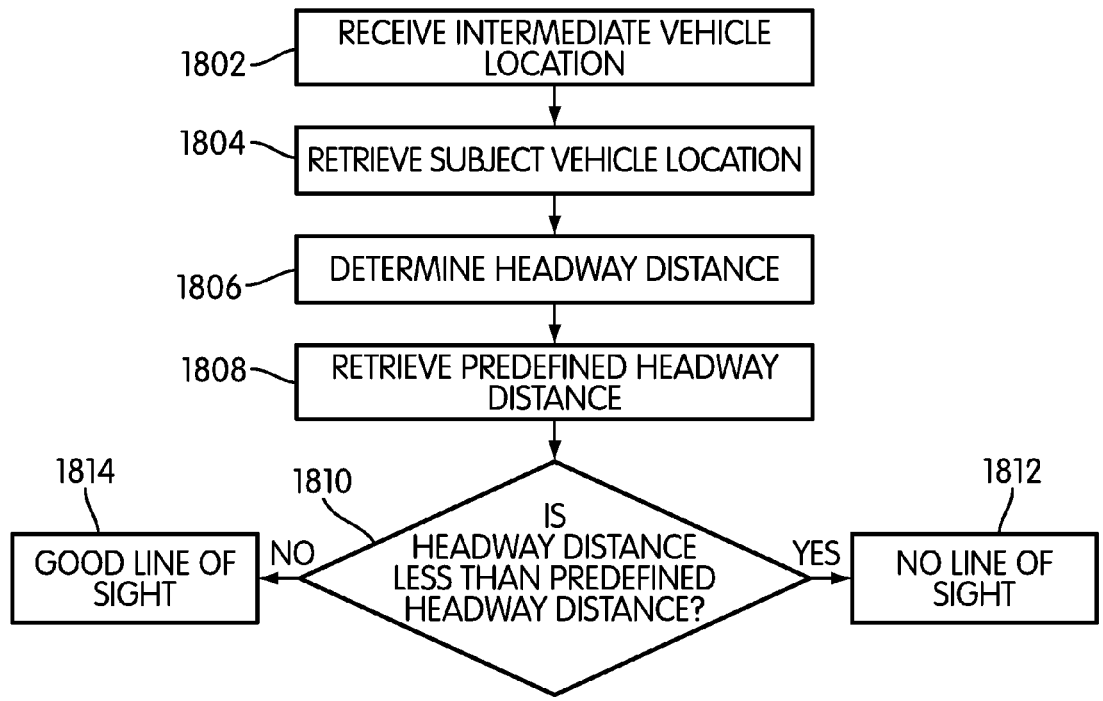
FIG. 18 is an embodiment of a process for determining line of sight conditions.

FIG. 18 illustrates an embodiment of a process for determining line of sight conditions according to headway distance between a subject vehicle and an intermediate vehicle. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 1802, ECU 120 may receive information related to a location of an intermediate vehicle. In some cases, the information can be received using a vehicle communication network. Next, during step 1804, ECU 120 may retrieve a current location for motor vehicle 102. In some cases, ECU 120 may receive information from a GPS receiver to determine the current location. Following this, during step 1806, ECU 120 may calculate a headway distance between motor vehicle 102 and the intermediate vehicle. Next, during step 1808, ECU 120 may retrieve a predefined headway distance.

After step 1808, ECU 120 may proceed to step 1810. During step 1810, ECU 120 may compare the current headway distance with the predefined headway distance. If the current headway distance is less than the predefined headway distance, then ECU 120 may proceed to step 1812, where it is determined that a driver does not have line of sight. Otherwise, ECU 120 may proceed to step 1814, where it is determined that a driver has good line of sight.

Figure 19:
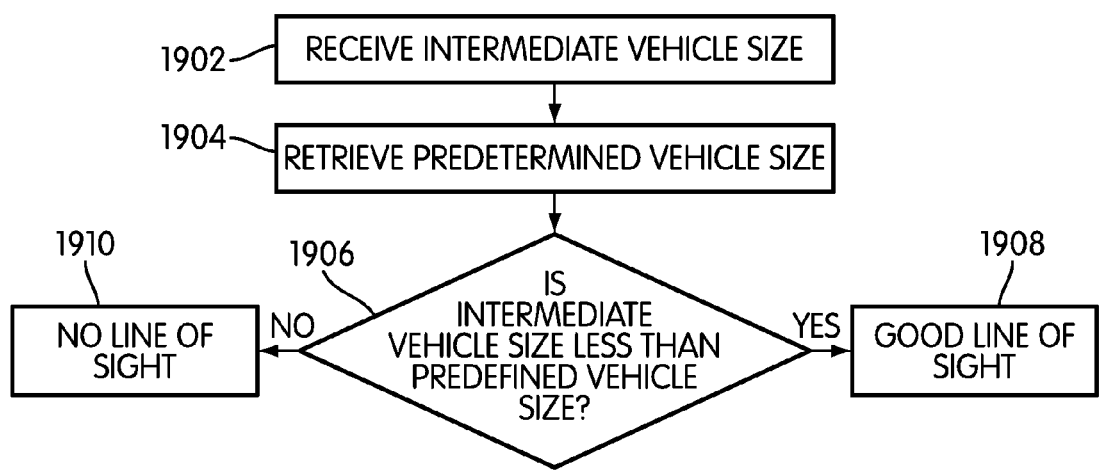
FIG. 19 is an embodiment of a process for determining line of sight conditions.

FIG. 19 illustrates an embodiment of a process for determining line of sight conditions according to a size of an intermediate vehicle. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 1902, ECU 120 may receive information related to the size of an intermediate vehicle. In some cases, the size could include a width, a length and a height. In other cases, only one dimension could be received. In still other cases, ECU 120 may receive a class of the intermediate vehicle, such as "truck," "sedan," "coupe," "motorcycle" as well as other classes of vehicles. Using this information, ECU 120 may estimate one or more dimensions of the intermediate vehicle according to the vehicle class.

Next, during step 1904, ECU 120 may retrieve a predetermined vehicle size. Following this, ECU 120 may proceed to step 1906. During step 1906, ECU 120 may determine if the intermediate vehicle size is less than the predefined vehicle size. If so, then ECU 120 may proceed to step 1908, where it is determined that the driver has good line of sight. Otherwise, ECU 120 may proceed to step 1910, where it is determined that the driver does not have line of sight.

Although the intermediate vehicle in the discussion above is a vehicle positioned in front of a subject vehicle, it will be understood that in other embodiments these provisions could be used for an intermediate vehicle positioned in any location between a subject vehicle and a target vehicle. For example, the methods discussed above could also be applied to situations in which an intermediate vehicle is disposed in front of a target vehicle, rather than a subject vehicle. Furthermore, these provisions can be applied to both stationary and moving intermediate vehicles. Still more, the method discussed above can be used with multiple intermediate vehicles, rather than just a single vehicle.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of operating a collision warning system in a motor vehicle, comprising the steps of:
   receiving information related to a target vehicle;
   determining if the target vehicle is in a line of sight of the motor vehicle;
   the collision warning system including multiple alert modes;
   operating the collision warning system in a normal alert mode when the target vehicle is in the line of sight of the motor vehicle;
   operating the collision warning system in an enhanced alert mode when the target vehicle is not in the line of sight of the motor vehicle;
   wherein the normal alert mode is different than the enhanced alert mode;
   wherein the step of operating the collision warning system further includes the steps of:
   determining that the collision warning system is operating in the normal alert mode;
   calculating a threat level, the threat level being associated with a threat of collision between the motor vehicle and the target vehicle and wherein the threat level is associated with a first threat level and a second threat level that is higher than the first threat level;
   issuing a warning alert when the threat level is the second threat level; and
   issuing no alert when the threat level is the first threat level.

2. The method according to claim 1, wherein the step of determining if the target vehicle is in the line of sight of the motor vehicle further includes the steps of:
   receiving a measured signal characteristic from a signal transmitted by the target vehicle;
   retrieving a reference signal characteristic; and
   determining a line of sight condition for the motor vehicle with respect to the target vehicle using the measured signal characteristic and the reference signal characteristic.

3. The method according to claim 1, wherein the step of determining if the target vehicle is in the line of sight of the motor vehicle further includes the steps of:
   receiving information related to the target vehicle;
   receiving information related to an intermediate vehicle; and
   determining if the intermediate vehicle obstructs the line of sight between the motor vehicle and the target vehicle.

4. The method according to claim 3,
   wherein the step of determining if the intermediate vehicle obstructs the line of sight further includes the steps of:
   receiving information related to a vehicle size of the intermediate vehicle;
   retrieving a predetermined vehicle size;
   determining that the intermediate vehicle does not obstruct the line of sight between the motor vehicle and the target vehicle when the vehicle size is less than the predetermined vehicle size; and
   determining that the intermediate vehicle does obstruct the line of sight between the motor vehicle and the target vehicle when the vehicle size is greater than the predetermined vehicle size.

5. The method according to claim 1, wherein the step of operating the collision warning system further includes the steps of:
   determining that the collision warning system is operating in the enhanced alert mode;
   calculating the threat level, the threat level being associated with the threat of collision between the motor vehicle and the target vehicle and wherein the threat level is associated with the first threat level and the second threat level that is higher than the first threat level;
   issuing the warning alert when the threat level is the second threat level; and
   issuing an informing alert when the threat level is the first threat level.

6. The method according to claim 1, wherein the normal alert mode is associated with the warning alert only and wherein the enhanced alert mode is associated with an informing alert and the warning alert.

7. A method of operating a collision warning system in a motor vehicle, comprising the steps of:
   receiving a signal transmitted by a target vehicle;
   determining a measured signal characteristic from the signal transmitted by the target vehicle;
   retrieving a reference signal characteristic corresponding to the measured signal characteristic;
   determining a line of sight condition for the motor vehicle with respect to the target vehicle using the measured signal characteristic and the reference signal characteristic;
   operating the collision warning system in a normal alert mode when the target vehicle is in the line of sight of the motor vehicle;

operating the collision warning system in an enhanced alert mode when the target vehicle is not in the line of sight of the motor vehicle;

wherein the normal alert mode is different than the enhanced alert mode;

wherein the step of operating the collision warning system further includes the steps of:

determining that the collision warning system is operating in the enhanced alert mode;

calculating a threat level, the threat level being associated with a threat of collision between the motor vehicle and the target vehicle and wherein the threat level is associated with a first threat level and a second threat level that is higher than the first threat level;

issuing a warning alert when the threat level is the second threat level; and issuing an informing alert when the threat level is the first threat level.

8. The method according to claim 7, wherein the measured signal characteristic is a received signal strength index of the signal.

9. The method according to claim 7, wherein the measured signal characteristic is a packet success ratio of the signal.

10. The method according to claim 7, wherein the measured signal characteristic is a first power component of the signal.

11. The method according to claim 7, wherein the measured signal characteristic is associated with a correlation between two or more receiving antennas.

12. The method according to claim 7, wherein the measured signal characteristic is associated with a plurality of measured signal characteristics.

13. The method according to claim 7, wherein the number of alerts issued in the enhanced alert mode is greater than the number of alerts issued in the normal alert mode.

14. The method according to claim 7, wherein the measured signal characteristic, the reference signal characteristic and a distance to the target vehicle are used to determine the line of sight condition for the motor vehicle with respect to the target vehicle.

15. A method of operating a collision warning system in a motor vehicle, comprising the steps of:

receiving information related to a target vehicle;

receiving information related to an intermediate vehicle;

determining if the intermediate vehicle obstructs the line of sight between the motor vehicle and the target vehicle;

operating the collision warning system in a normal alert mode when the target vehicle is in the line of sight of the motor vehicle;

operating the collision warning system in an enhanced alert mode when the target vehicle is not in the line of sight of the motor vehicle;

wherein the step of determining if the intermediate vehicle obstructs the line of sight further includes the steps of:

receiving information related to a location of the intermediate vehicle;

calculating a headway distance between the motor vehicle and the intermediate vehicle;

retrieving a predetermined headway distance;

determining that the intermediate vehicle does not obstruct the line of sight between the motor vehicle and the target vehicle when the headway distance is greater than the predetermined headway distance; and determining that the intermediate vehicle does obstruct the line of sight between the motor vehicle and the target vehicle when the headway distance is less than the predetermined headway distance.

16. The method according to claim 15, wherein the normal alert mode is associated with a warning alert only and wherein the enhanced alert mode is associated with an informing alert and a warning alert.

17. The method according to claim 15, wherein the step of determining if the intermediate vehicle obstructs the line of sight further includes the steps of:

receiving information related to a vehicle size of the intermediate vehicle;

retrieving a predetermined vehicle size;

determining that the intermediate vehicle does not obstruct the line of sight between the motor vehicle and the target vehicle when the vehicle size is less than the predetermined vehicle size; and determining that the intermediate vehicle does obstruct the line of sight between the motor vehicle and the target vehicle when the vehicle size is greater than the predetermined vehicle size.

18. The method according to claim 17, wherein the step of receiving information related to the vehicle size includes a step of receiving a vehicle type of the intermediate vehicle and estimating the vehicle size according to the vehicle type.

19. The method according to claim 17, wherein the vehicle size is associated with a vehicle width.

20. The method according to claim 15, wherein the line of sight of the motor vehicle with respect to the target vehicle is determined using the headway distance from the motor vehicle to the intermediate vehicle and an estimated width of the intermediate vehicle.

* * * * *